United States Patent [19]

Koppenstein et al.

[11] Patent Number: 5,259,658
[45] Date of Patent: Nov. 9, 1993

[54] ARRANGEMENT FOR A PARTIAL STIFFENING OF A TOP COVERING OF A FOLDING TOP

[75] Inventors: Harald Koppenstein, Filderstadt; Jürgen Schrader, Stuttgart, both of Fed. Rep. of Germany

[73] Assignee: Daimler-Benz Aktiengesellschaft, Fed. Rep. of Germany

[21] Appl. No.: 974,819

[22] Filed: Nov. 16, 1992

Related U.S. Application Data

[63] Continuation of Ser. No. 888,294, May 26, 1992, abandoned, which is a continuation of Ser. No. 727,394, Jul. 5, 1991, abandoned, which is a continuation of Ser. No. 480,657, Feb. 15, 1990, abandoned.

[30] Foreign Application Priority Data

Mar. 7, 1989 [DE] Fed. Rep. of Germany ....... 3907229

[51] Int. Cl.⁵ ................................ B60J 7/12
[52] U.S. Cl. ..................... 296/107; 160/352
[58] Field of Search .......... 160/DIG. 7, 352; 296/107, 116, 120.1, 121

[56] References Cited

U.S. PATENT DOCUMENTS

| | | | |
|---|---|---|---|
| 2,000,626 | 5/1935 | Votypka | 296/107 |
| 2,798,763 | 7/1957 | Dujic | 296/107 |
| 3,237,983 | 3/1966 | Hollar, Jr. | 296/107 |
| 4,741,571 | 5/1988 | Godette | 296/107 |
| 4,778,215 | 10/1988 | Ramaciotti | 296/107 |
| 4,840,419 | 6/1989 | Kolb | 296/120.1 X |

FOREIGN PATENT DOCUMENTS

| | | | |
|---|---|---|---|
| 163845 | 3/1954 | Australia | 296/107 |
| 137720 | 1/1934 | Austria | 296/107 |
| 3724532 | 11/1988 | Fed. Rep. of Germany | |
| 3818616 | 6/1989 | Fed. Rep. of Germany | |
| 2141389 | 12/1984 | United Kingdom | 296/107 |

Primary Examiner—David M. Mitchell
Assistant Examiner—Andrew C. Pike
Attorney, Agent, or Firm—Evenson, McKeown, Edwards & Lenahan

[57] ABSTRACT

A partial stiffening of a covering of a folding top is provided by a wide tension-belt element which is stretched between two supporting structure members of the folding top and which, extending underneath the stretched folding-top covering, bears supportively against the folding-top covering on the wide side. The tension-belt element can be used for stiffening a zone of the folding-top covering curved transversely relative to its longitudinal extension, the side of the tension-belt element facing the folding-top covering has, at two spaced supporting locations, a contour matched to the intended transverse curvature of the folding-top covering. Supporting forces are transmitted by a spring prestress directed towards the folding-top covering.

8 Claims, 6 Drawing Sheets

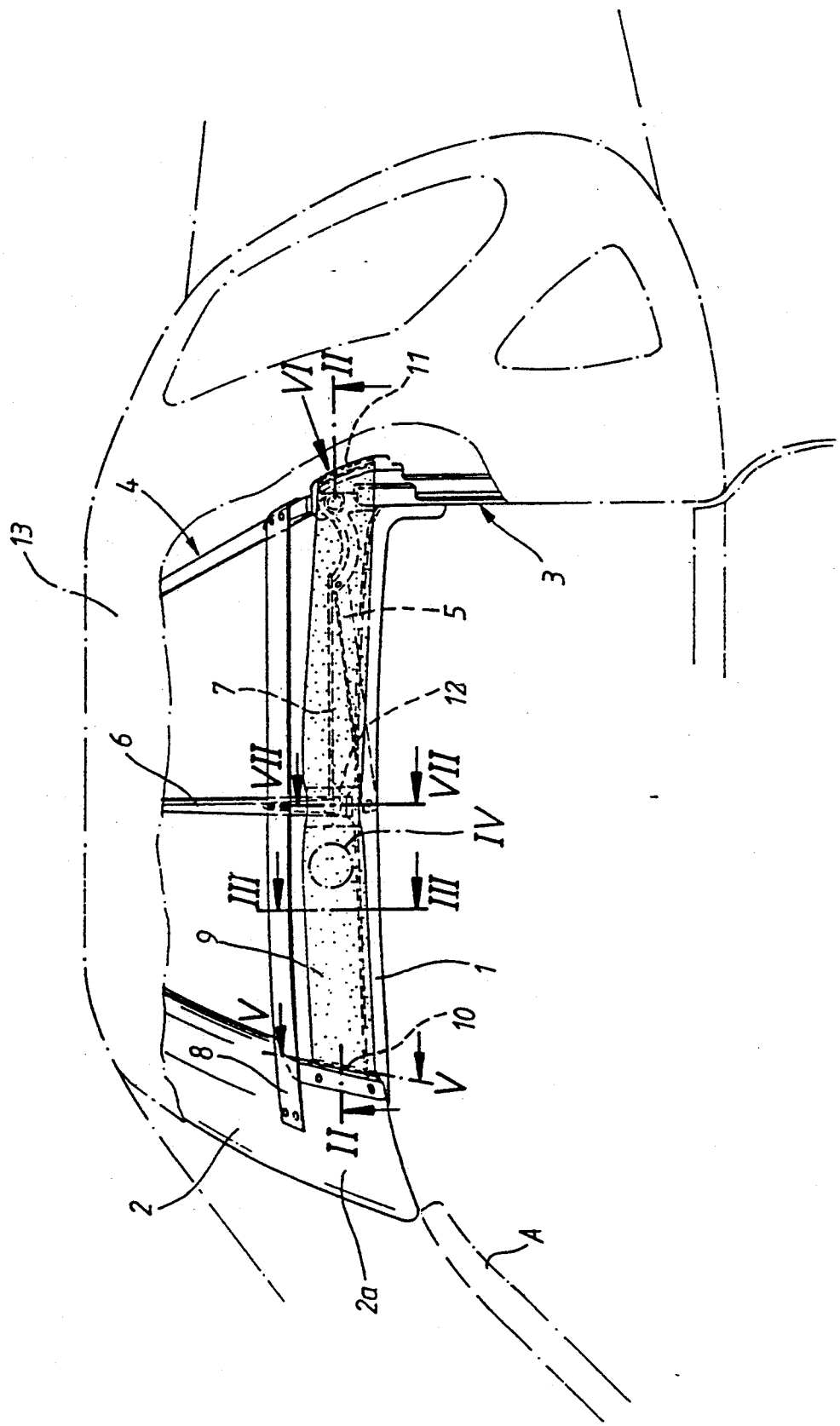

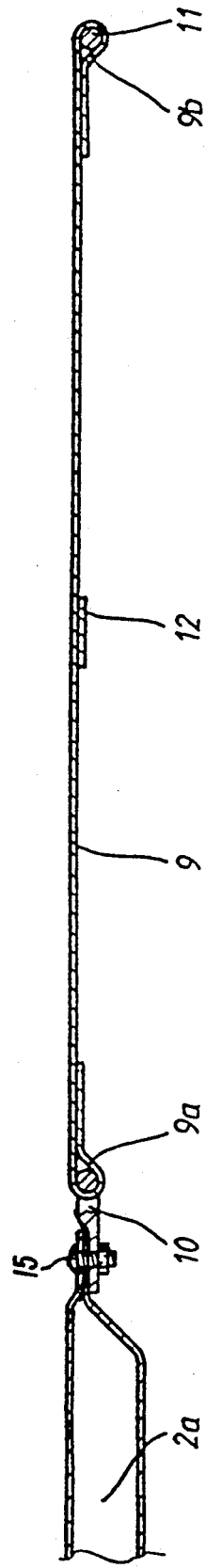
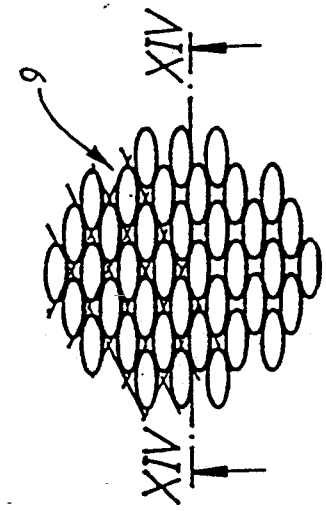
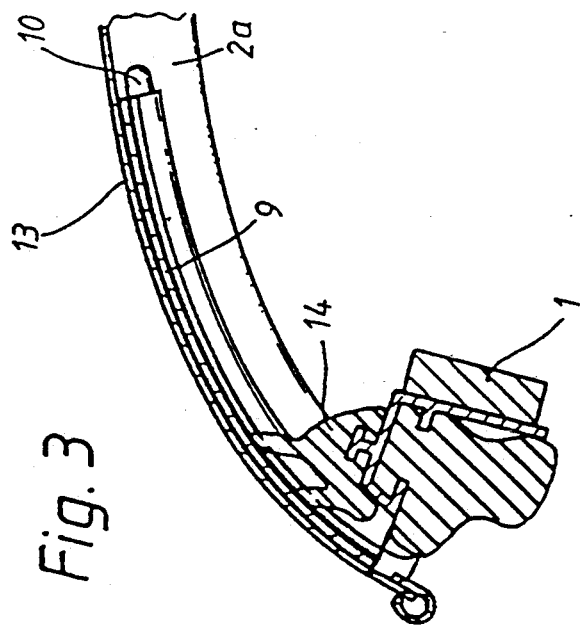

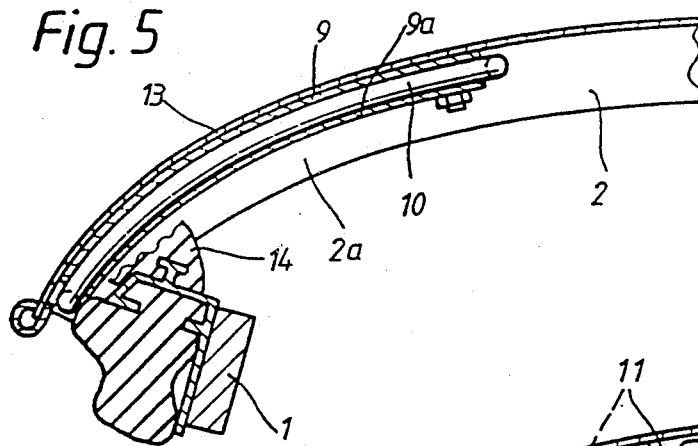
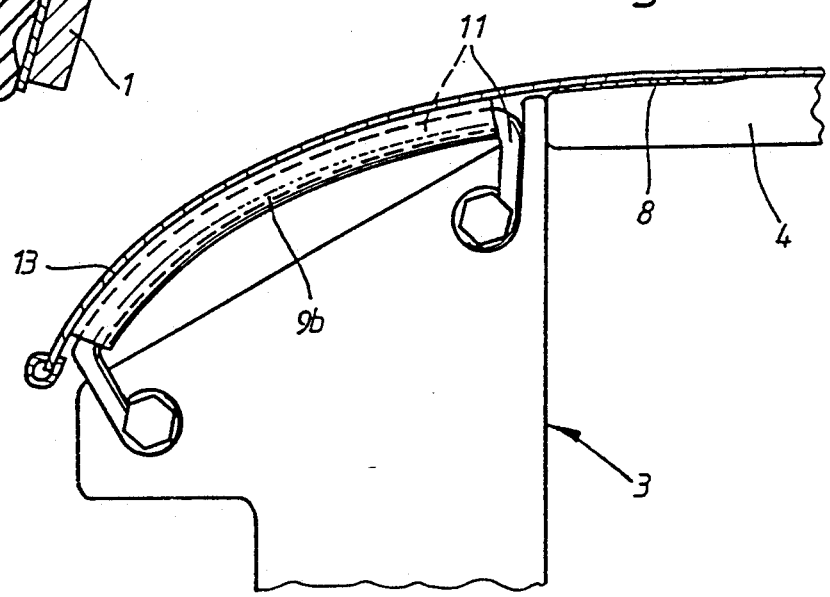
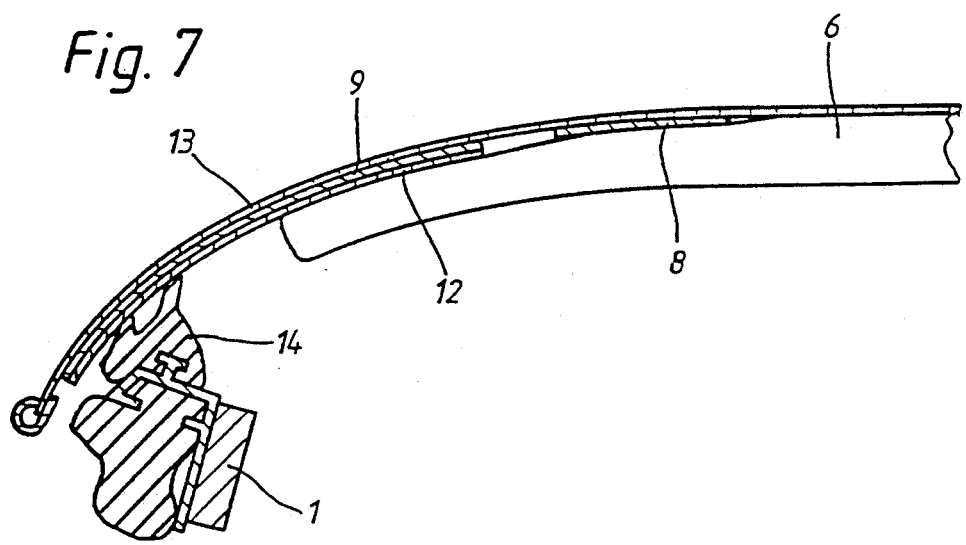

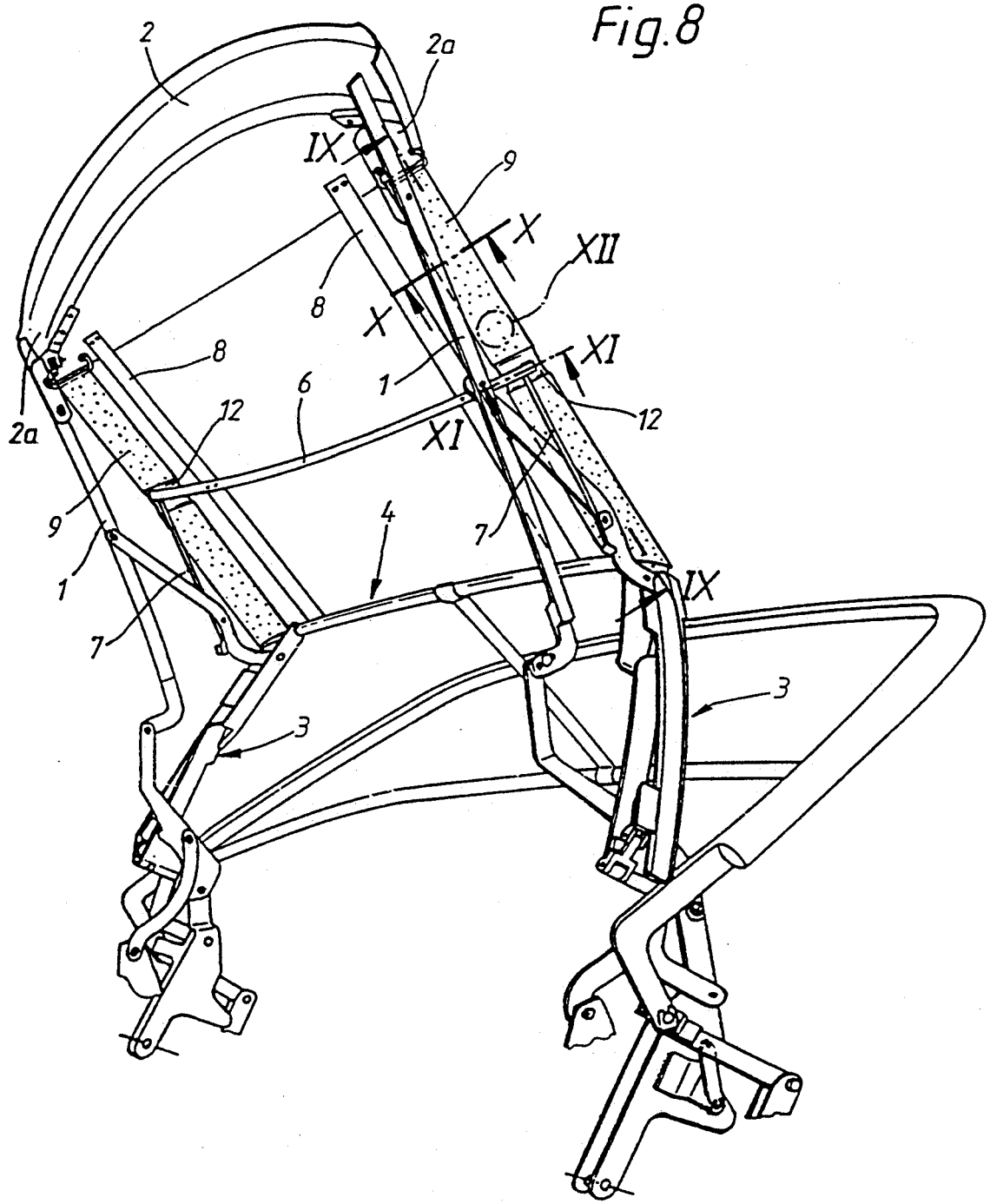

ARRANGEMENT FOR A PARTIAL STIFFENING OF A TOP COVERING OF A FOLDING TOP

This is a continuation of application Ser. No. 07/888,294, filed May 26, 1992, now abandoned, which is a continuation of application Ser. No. 07/727,394, filed Jul. 5, 1991, now abandoned, which is a continuation of application Ser. No. 07/480,657, filed Feb. 15, 1990, now abandoned.

BACKGROUND AND SUMMARY OF THE INVENTION

The present invention generally relates to an arrangement for a partial stiffening of a covering of a folding top, and more particularly, to an arrangement adapted to stiffen surface regions of a folding-top covering which have an arcuate contour.

A stiffening of this type is disclosed by German Patent Specification 3,818,616 wherein an essentially plane length zone in a rear region of the roof surface is supported by two tension belts. For this purpose, the two tension belts are stretched between the bow tube of a main bow and a virtually straight middle region of a corner bow. With the folding top closed, the two tension belts bear on the inner face of the folding-top covering virtually over their entire tensioning length.

In addition to their supporting function, the two tension belts of the above-noted patent serve the purpose of retaining the corner bow, connected to the fabric-holding bar via wire cables, in the desired installation position in the last phase of the closing movement of the top which is accompanied by a pivoting back of the fabric-holding bar. When the folding top is closed, the corner bow is fixed in its installation position by the oppositely directed pulling forces of the wire cables under the tension belts.

Furthermore, lateral roof frames of a folding-top structure according to German Patent Specification 3,818,616, in conformity with the folding-top structure of German Patent Specification 3,724,532, consists of slender flat iron bars which make it possible to fold the folding-top structure more compactly. However, this design of the lateral roof frame necessarily entails the disadvantage that they can scarcely make any contribution to stabilizing the lateral roof contour by a shaping support of the folding-top covering spanning it.

In this difficult region of the roof surface, therefore, the folding-top fabric has to be drawn into the desired roof contour of arcuate cross section solely by longitudinal tensioning forces in the folding-top fabric, its particular path being predetermined by the arcuate contour of the roof-top flank and by the arcuate contour of the corner region of the main bow. However, it is virtually impossible to execute this procedure especially because of the associated extreme tensile stress exerted on the folding-top fabric, since the aim is to achieve as smooth a folding-top structure as possible and as uniform a tension distribution in the folding-top covering as possible.

Thus, an object on which the present invention is based is to improve a partial stiffening of a folding-top covering, to the effect that it can be used for stiffening surface regions of the folding-top covering which have an arcuate contour.

The solution, according to preferred embodiments of the present invention, for achieving this object and other objects, results from providing a tension-belt element, in the form of, for example, a belt band, along a curved zone of the folding top covering. Both belt bands with scarcely any longitudinal elongation and resiliently stretchable belt bands are possible as the tension-belt element. So that the supporting forces could be transmitted via a belt band with hardly any longitudinal elongation, it is necessary to provide, on the belt band, a plurality of shaped pieces supported on the belt band under a compression-spring load, with the result that, with the folding top closed, these shaped pieces would bear against the folding-top fabric way of their shaping supporting contour under the expansion prestress provided by compression springs.

Preferably, however, a belt band is made of resiliently longitudinally stretchable material, since this requires no additional springs which need a corresponding constructional space.

If the folding-top covering contour to be stiffened changes considerably over the tensioning length, it is expedient if even the longitudinally stretchable belt band is equipped with a plurality of shaped pieces which are distributed over its length and the supporting contours of which are coordinated with the change in shape over the length.

In contrast, if the design of the folding-top covering contour to be stiffened is largely constant over the length, it is more expedient to attach the tension band with such a curvature that a wide side of the tension band itself bears supportively against the folding-top covering.

There are various possibilities, too, for the construction of the resiliently stretchable tension band.

Thus, the tension band can comprise a plurality of spring cords extending parallel to one another and made of helical tension springs, such as are known from expanders, in which case spring cords should be connected by means of a sheathing so as to form a wide band.

Alternatively, a shaped shell made of stretchable material or with stretchable length portions would also be used.

However, a prestressed belt band with a supporting structure made of an elastomeric material, such as rubber, is considered the most advantageous solution because of the small constructional space which it requires.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a tension-belt element stretched to its intended final length in a lateral roof region of a folding-top structure in a motor vehicle shown in dot dash-line., FIG. 2 is a longitudinal section through the tension-belt element along line II—II;

FIG. 3 shows a vertical section along line III—III in FIG. 1;

FIG. 4 shows schematically a known woven structure of the tension-belt element on an enlarged scale of the area IV shown in FIG. 1 according to one embodiment of the present invention;

FIG. 5 is a sectional view along line V—V of FIG. 1;

FIG. 6 is an end view taken in the direction of arrow VI of FIG. 1;

FIG. 7 is a sectional view taken along line VII—VII of FIG. 1;

FIG. 8 is a perspective view of the folding top structure in an intermediate position in which it has been folded partially toward the rear and in which the tension-belt element, though still held tightly, has changed length;

DETAILED DESCRIPTION OF THE DRAWINGS

Figure 9:
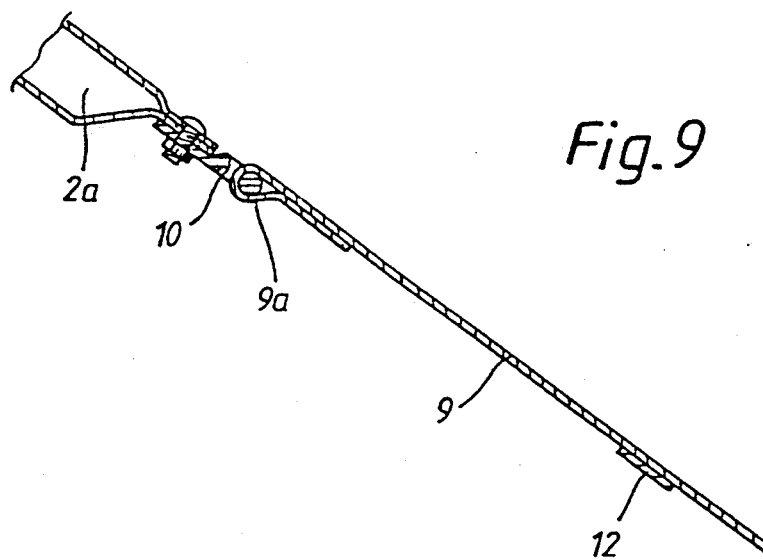
FIG. 9 is a longitudinal sectional view through the tension-belt element to FIG. 2 but taken through line IX—IX in FIG. 8.
Figure 10:
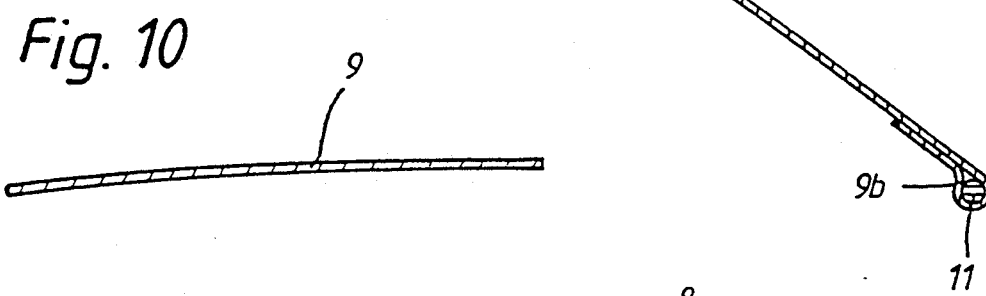
FIG. 10 is a sectional view showing the width direction of the tension-belt element through line X—X in FIG. 8.
Figure 11:
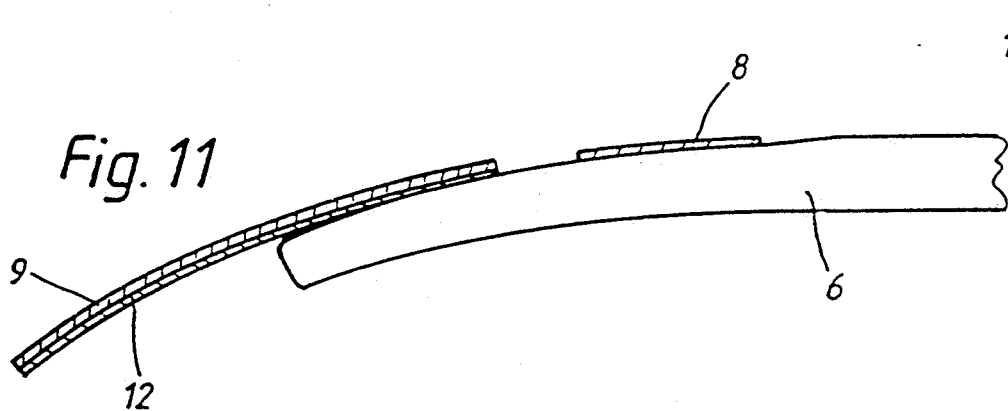
FIG. 11 is a sectional view along line XI—XI in FIG. 8.

With a folding-top structure of the folding top in a closed position shown in FIG. 1, a lateral roof frame 1 extends along an upper edge zone of a closed side window of the convertible shown in dot-dash line. A front end of the lateral roof frame 1 is connected in an articulated manner to a roof top 2 joined, for example, to an upper frame section of a windscreen frame A. Rearwards, the lateral roof frame 1 extends as far as a folding-top column 3 of a main bow 4, the folding-top column 3 itself being connected in an articulated manner to the roof frame 1 by a roof-frame link 5.

An intermediate bow 6, reaching to the lateral roof frame 1, likewise extends in a width of transverse direction of the roof between the main bow 4 and the roof top 2. The intermediate bow 6 is under an upwardly directed prestress by leaf-spring elements 7 provided at both sides and is connected by a holding strap 8 at the front of the roof to the roof top 2 and at the rear of the roof to a middle tube of the main bow 4. Fastened laterally next to the holding strap 8 is a wide-shaped, rubber-elastically stretchable, tension-belt band 9 which is likewise held by the roof top 2 and by the main bow 4 and which an arcuate contour which conforms to the contour of a lateral edge zone of the roof, as seen in a width of transverse direction thereof as seen in FIG. 3.

So that the belt band 9 assumes this arcuate contour form under the influence of tensile forces, ends thereof 9a, 9b are each connected respectively to supports comprising a belt-holding shackles 10, 11 which have the desired arcuate roof covering contour as seen in FIG. 3. The two belt-holding shackles 10, 11 are spaced from each other longitudinally and consist of thick spring wire bent in a U-shape as best seen in FIGS. 1 and 2. The ends of the belt-holding shackle 10 are attached, for example, by screws 15, to the roof top 2 below an arcuately curved flank 2a of the roof top, so that a shaping middle leg 10′ thereof extends rearwardly a short distance from the flank 2a essentially in longitudinal alignment with the latter as best seen in FIGS. 1, 2 and 3. In contrast, the end legs of the belt-holding shackle 11 are angled in the plane spanned by a shaped middle leg 11′ forming the arcuate curve and are attached, for example, by screws, to the folding-top column 3 on a rear face in the corner region of the main bow 4.

As can be seen in conjunction with FIGS. 2, 3 and 5, a simple fastening of the belt band 9 over the width of the belt-holding shackles 10, 11 has been obtained by folding [round]an excess length of the belt band 9 around the shackles in the manner of, for example, a hem and sewing the hem to the belt band 9. The holding loops 9a and 9b obtained thereby extend transversely or in the width direction relative to the longitudinal direction of the belt band 9, and the shaping middle legs of the belt-holding shackles 10, 11 pass through the loops over their length. It is thereby possible to avoid the need for separate fastening means over the width of the belt band.

Above the intermediate bow 6, a protective overlay 12 is attached, for example, by sewing, to and underneath the belt band 9 and is glued to the band 9 over the surface of the band. This protective overlay 12, consisting of the same woven cloth as the belt band 9, protects the belt band 9 against rapid wear caused by mechanical stress exerted on the belt band 9 by the intermediate bow 6. Furthermore, the protective overly 12 gives, as shown in FIG. 7, the belt band 9 a specific arcuate contour. This is necessary because the intermediate support of the belt band 9 by the intermediate bow 6 does not extend over the entire width of the belt band. The arcuate contour is obtained because, in the unstressed state of the protective overlay 12 the width of the protective overlay 12 is smaller than the width of the belt band 9, and because the protective overlay 12, before being connected to the belt band 9, is stretched over the width of the latter.

As can be seen in FIG. 3, because the folding-top covering 13 is supported on the tensioned belt band 9, there is an exactly arcuately curved contour of the lateral roof edge which is also sufficiently stiffened to remain dimensionally stable even at high driving speeds of the convertible vehicle.

Also, the form of the roof contour is not impaired by the upwardly directed expansion forces of a sealing section 14 which is arranged between the roof frame 1 and the inner face of the belt band 9 and which is fastened at the roof frame 1.

However, where a belt band 9 with a supporting structure made of rubber is concerned, this presupposes that the belt band 9 is under sufficient prestress and that it is prestressed both in the longitudinal direction and in the direction of width and obliquely relative to these directions, even though only forces acting in the longitudinal direction can be exerted for the tensioning operation.

Figure 12:
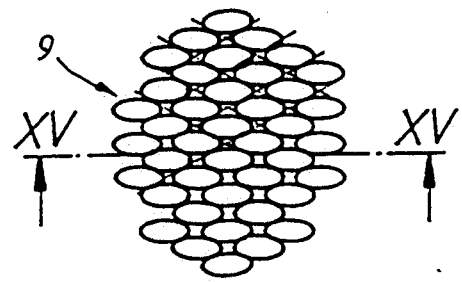
FIG. 12 shows the woven structure of the unstretched tension-belt element on an enlarged scale in the area designated by the dot-dash circle XII in FIG. 8.
Figure 14:
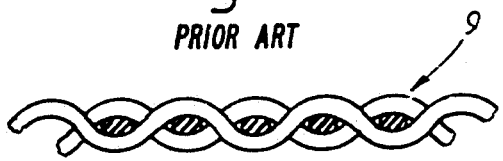
FIG. 14 is a cross-sectional view of the woven structure along line XIV—XIV in FIG. 4 when the tension-belt element is fully stretched.
Figure 15:
FIG. 15 is a cross-sectional view of the woven structure similar to FIG. 14 but taken along line XV—XV of FIG. 12 when the tension-belt element is in the least stretched state.

To satisfy this requirement, the supporting structure has a known interlacing of a shape which can be seen more clearly in FIGS. 4 and 14 in the fully stretched state and in FIGS. 12 and 15 in the least stretched state. This interlacing is obtained by interweaving transverse rubber threads with longitudinal rubber threads in the manner of a link strap as shown in FIGS. 14 and 15.

Figure 13:
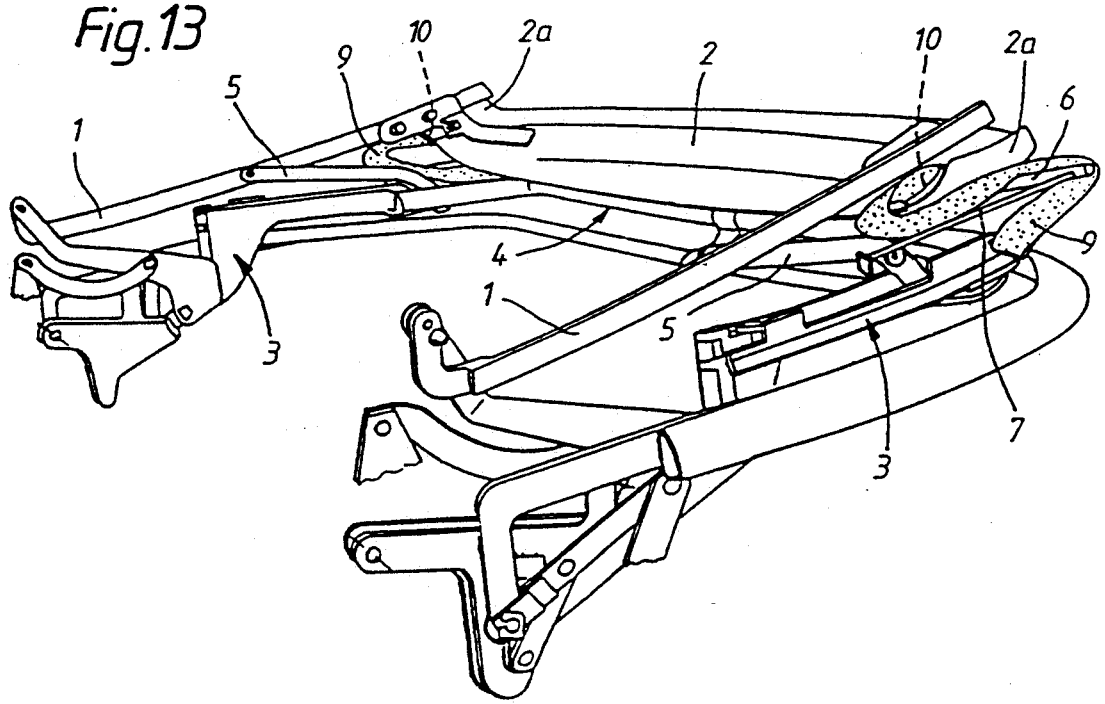
FIG. 13 is a perspective view of the folding-top structure when it has been completely opened.

Thus, after a movement of the roof top 2 relative to the main bow 4 caused by the mechanical positive control of the folding-top structure when the folding top is being closed from the fully open position shown in FIG. 13 the tension belt band 9 is stretched positively to the intended final length, with the result that it automatically assumes its final supporting shape as shown in FIG. 1.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. An arrangement for a partial stiffening of a motor vehicle folding-top covering of a folding top, comprising:
   a tension-belt element having a curved contour extending transversely relative to a longitudinal direction of the tension-belt element;
   means between which the tension-belt element is stretched to a tensioning length for arranging the tension-belt element underneath the folding-top covering;
   means for shaping at desired locations of the tension-belt element a side of the tension-belt element facing the folding-top covering with a contour matched to a transverse arcuate contour of the folding-top covering; and
   means for transmitting supporting forces directed toward the folding-top covering so that the side of the tension-belt element supportively bears against the folding-top covering in a stretched position of the tension-belt element.

2. The arrangement according to claim 1, wherein the transverse curvature of the folding-top covering is substantially constant over the length of the tension-belt element.

3. The arrangement according to claim 2, wherein the arranging means comprise shackles for holding each end of the tension-belt element and having a shape which corresponds to the arcuate contour of the folding-top covering.

4. The arrangement according to claim 3, wherein the shackles each comprises a bent rod and the ends of the tension-belt element are configured as holding loops which surround the bent rod of each shackle.

5. The arrangement according to claim 1, wherein in a tensioned state, the tension-belt element is configured to be stretched elastically.

6. The arrangement according to claim 5, wherein the tension-belt element has a rubber-elastic supporting structure.

7. The arrangement according to claim 1, wherein the folding-top covering includes an intermediate bow for the folding-top covering in a region extending from a roof surface to a lateral roof frame, and the arranging means connect one end of the tension-belt element to a roof top and another end to a main bow of supporting structure members of the folding top.

8. The arrangement according to claim 7, wherein the intermediate bow reduces a free tensioning length of the tension-belt element and supports and intermediate portion of the tension-belt element partially along the arcuate contour, and a protective overlay is connected to the tension-belt element so as to provide the arcuate contour.

* * * * *